United States Patent [19]

Grigat et al.

[11] Patent Number: 5,009,925
[45] Date of Patent: Apr. 23, 1991

[54] PROCESS FOR THE PRODUCTION OF MAGNETIC RECORDING CARRIERS

[75] Inventors: Ernst Grigat, Leverkusen; Walter Meckel, Neuss-Uedesheim; Burkhard Nippe, Munich, all of Fed. Rep. of Germany

[73] Assignee: Agfa Gevaert Aktiengesellschaft, Leverkusen, Fed. Rep. of Germany

[21] Appl. No.: 256,131

[22] Filed: Oct. 5, 1988

Related U.S. Application Data

[63] Continuation of Ser. No. 86,851, Aug. 19, 1987, abandoned.

[30] Foreign Application Priority Data

Aug. 30, 1986 [DE] Fed. Rep. of Germany ....... 3629606

[51] Int. Cl.$^5$ ................. B05D 3/00; G11B 23/00
[52] U.S. Cl. ..................... 427/48; 427/128; 427/130; 428/694; 428/900
[58] Field of Search .............. 428/694, 900; 427/128, 427/130, 48

[56] References Cited

U.S. PATENT DOCUMENTS

| | | | |
|---|---|---|---|
| 4,368,237 | 1/1983 | Yamada | 428/900 |
| 4,404,253 | 9/1983 | Kohler et al. | 428/327 |
| 4,533,565 | 8/1985 | Okita | 427/130 |
| 4,562,117 | 12/1985 | Kikukawa | 428/900 |
| 4,678,705 | 7/1987 | Huisman | 427/130 |
| 4,732,813 | 3/1988 | Huisman | 428/900 |

Primary Examiner—Paul J. Thibodeau
Attorney, Agent, or Firm—Connolly & Hutz

[57] ABSTRACT

Magnetic recording carriers having improved mechanical properties are obtained by using, as dispersing agents, compounds corresponding to the general formula

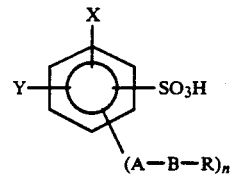

which are attached to the magnetic pigment by their SO$_3$H group and which have reactive groups by which they are linked to the reactive groups of the polymeric binder through a difunctional or higher functional isocyanate.

5 Claims, No Drawings

PROCESS FOR THE PRODUCTION OF MAGNETIC RECORDING CARRIERS

This application is a continuation, of application Ser. No. 86,851, filed Aug. 19, 1987, now abandoned.

This invention relates to a process for the production of magnetic recording carriers by preparing a dispersion consisting of finely divided magnetic pigments, a dispersing agent, the usual additives and a solution or dispersion of a polymeric binder, applying the dispersion as a layer to a non-magnetizable layer support and then orientating the anisotropic, magnetic material in a magnetic field and drying the applied layer.

In magnetic recording carriers such as audio tapes, video tapes and magnetic sheets and cards, it is customary to use ferromagnetic iron oxide, cobalt ferrite, ferromagnetic chromium dioxide particles or fine ferromagnetic metal particles. With the increasing importance of systems for high density recording of signals of short wavelengths, it becomes necessary for the ferromagnetic pigments to possess magnetic recording properties which are suitable for recording at a high density, for example a high coercivity and high residual flux density. Although fine ferromagnetic metal pigments appear to be the most suitable for this purpose, they have a natural tendency to undergo oxidation and their magnetic properties are more readily impaired than those of magnetic oxide pigments.

The dispersing agents are normally added to the other starting materials for the magnetic dispersion at the very beginning of the dispersing process in order to facilitate distribution of the magnetic material. The substances used for this purpose are mainly surface active substances which have a hydrophilic residue and a hydrophobic residue in their molecular structure and the active structure of which has an anionic, cationic, amphoteric or non-ionic character. These dispersing agents require very careful adjustment of their quantity in the overall formulation since under unfavourable external conditions an excess of these substances, for example lecithin, readily migrates to the surface of the magnetic recording carrier where it forms deposits and contaminates the tape-carrying parts of the instrument, which is highly undesirable. With most dispersing agents it is found that once they have reached a certain concentration equal to a saturation occupation of the active centres of the magnetic pigment surface, any further increase in their concentration does not result in any improvement in the dispersibility and hence in the density of the magnetic layer and its capacity for orientation, and that an increase in the quantity of dispersing agent has a deleterious effect on the mechanical properties of the magnetic layer, in particular on the abrasion resistance.

Numerous Patent Applications are therefore in existence which describe improved dispersing agents. Boron compounds are described in U.S. Pat. No. 4,465,608 and EP No. 0 101 591 polymers containing a polar functional group and having a degree of polymerisation not greater than 100 are described in U.S. Pat. No. 4,407,901 and the addition of a fatty acid and a fatty acid ester to the magnetic layer to disperse fine metal pigments is described in DE-OS No. 33 02 911 = U.S. Pat. No. 4,465,737. An organometallic compound of the ether type in the form of a titanate is claimed in DE-OS No. 3 139 297.

In other publications, organic phosphorus compounds are described as dispersing agents. A combination of primary or secondary phosphoric acid polyethers with lecithins has been filed in EP No. 0 137 926 while reaction products of polyphosphoric acid with a reaction product of an oxo alcohol containing 6 to 20 carbon atoms with ethylene oxide and propylene oxide is described in U.S. Pat. No. 4,581,246.

Alkylaryl sulphonic acids used alone or in combination with phosphoric acid esters are claimed as dispersing agents in GB No. 1 415 949. Magnetic recording carriers produced with the aid of these dispersing agents have excellent mechanical and electroacoustic properties but under unfavourable weather conditions the magnetic heads of recorders are liable to be corroded by vagrant dispersing agent.

It is an object of the present invention to provide a process for the production of magnetic recording carriers which are distinguished by the excellent distribution of the magnetic pigments in the magnetic layer and especially by their high directivity and by their excellent recording properties due to the high magnetic remanence and in which the magnetic layer has a smooth surface but at the same time excellent abrasion properties and in which the disadvantages described above do not occur.

The present invention has solved this problem by a process for the production of magnetic recording carriers comprising the preparation of a dispersion consisting of finely divided magnetic pigments, a dispersing agent, the usual additives, a solution or a dispersion of a binder and a cross-linking agent and application of the dispersion to a non-magnetizable layer support followed by orientation of the magnetic pigment by means of a magnetic field and drying of the applied layer, characterised in that the dispersing agent used consists of at least one compound containing at least one reactive group which firmly binds the dispersing agent to the magnetic pigment and at least one other reactive group which links the dispersing agent to a polymeric binder containing reactive groups by means of a difunctional or higher functional isocyanate.

Particularly suitable for the process according to the invention are compounds corresponding to the general formula

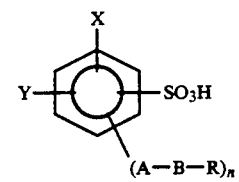

wherein

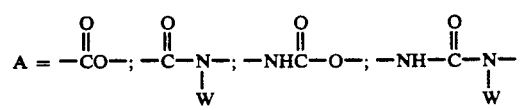

W = H or an optionally branched alkyl group having 1 to 30 carbon atoms,

B = a straight chained, optionally branched alkyl group optionally containing hetero atoms, a cycloaliphatic group, a cycloaliphatic-aromatic group,

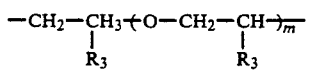

wherein
n=1 or 20
m=1-20,
$R_3$=H, $CH_3$,

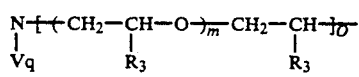

wherein
V=alkyl with 1-30 carbon atoms,
O=1,2, or 3,
q=0 or 1
0+q=3;

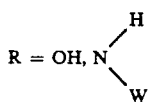

X, Y=H, $C_1$-$C_{30}$-alkyl or $C_1$-$C_{30}$-O-alkyl
X=Y or X≠Y.

In the compounds claimed here, the simultaneous presence of a sulphonic acid group, Zerewitinoff-active groups R and higher alkyl groups with at least 8 carbon atoms in one and the same molecule is essential to this invention.

The compounds to be used for the process according to the invention may be prepared by a ring opening reaction of one of the starting compounds

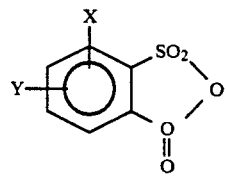

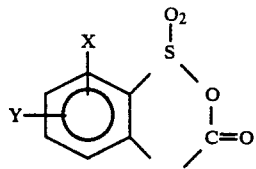

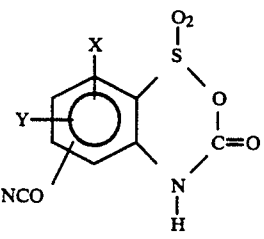

with nucleophilic compounds of the formula B—(R)$_e$
wherein e=1, 2, 3, 4.

The following are preferred starting compounds:

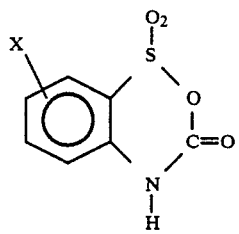

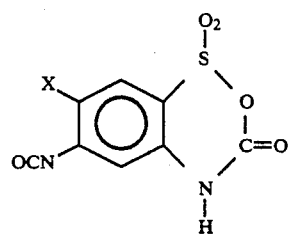

wherein X denotes a methyl or isododecyl group obtained by the addition of chlorosulphonic acid to the corresponding mono- or diisocyanates according to the teaching of U.S. Pat. No. 3,905,929. Another preferred starting compound is that corresponding to the following formula

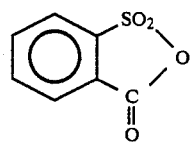

which is readily obtainable by the elimination of water from orthobenzoic acid sulphonic acid. The desired dispersing agents according to the invention are obtained by reacting these compounds, preferably with bifunctional compounds of the type B(R)$_e$, e.g. glycols such as hexane-1.6-diol, diamines such as N,N'-dimethylethylenediamine or ethoxylated dodecylamine or stearylamine.

The inventive idea thus lies in the feature that the dispersing agent, which normally, e.g. as in the case of the AS-3-acid type disclosed in GB No. 1 415 949 is only linked to one OH group of the magnetic pigment (for example FeO$_x$) through its SO$_3$H group, now contains in addition one or more reactive groups, e.g. NH or OH, which link the dispersing agent to reactive groups of the polymeric binder, e.g. OH or NH groups, by NCO groups of the difunctional or higher functional isocyanate. The dispersing agent is thereby at least partly built into the cross-linking structure of the magnetic layer, with the result, as will be clear from the examples which follow, that the mechanical properties are substantially improved without any loss in electroacoustic properties.

Examples of dispersing agents obtainable by the process according to the invention are mentioned below but the invention is not limited to these examples.

Compound 1

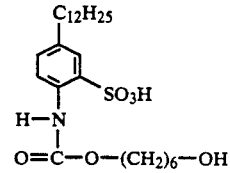

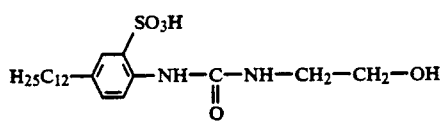
Compound 2

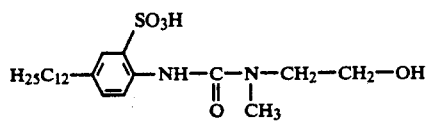
Compound 3

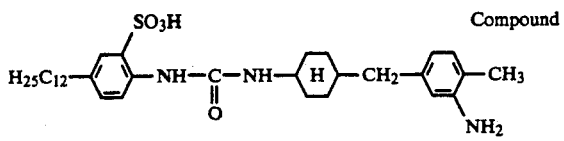
Compound 4

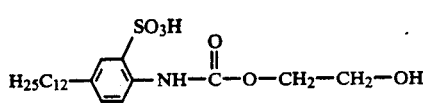
Compound 5

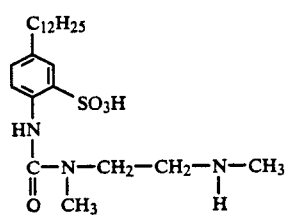
Compound 6

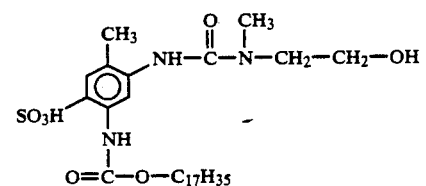
Compound 7

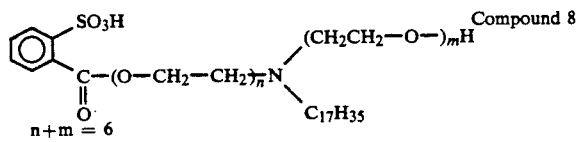
Compound 8

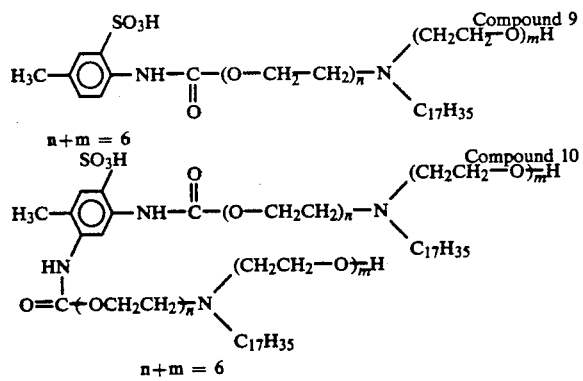
Compound 9

Compound 10

Examples of methods of preparation of some of the dispersing agents which may be used for the process according to the invention are given below.

Preparation of Preliminary Product A 430.5 g of 4-Isocyanato-isododecylbenzene are dissolved in 1.5 l of 1,2-dichloroethane (anhydrous) and heated to 30° C. A solution of 174.8 g (1.5 mol) of chlorosulphonic acid in 400 ml of 1,2-dichloroethane is added dropwise over a period of about 4 hours at 30° to 40° C. After a copious stream of nitrogen has been blown through the reaction mixture (17 to 20 hours at about 40° C.) about 800 ml of 1,2-dichloroethane are distilled off at normal pressure. The reaction mixture is then concentrated to a solids content of 60% on a rotary evaporator. The brown, highly viscous product obtained when the reaction mixture has cooled to room temperature is adjusted to a solids content of 50% with dioxane (anhydrous). A dark, clear, low viscosity solution is obtained.

Preparation of Preliminary Product B

1 Mol of p-tolylisocyanate is dissolved in 600 ml of 1,2-dichloroethane and an anhydrous stream of nitrogen which has been passed through 65% oleum is passed over the surface of the stirred solution at 2°–5° C. A yellowish, pulverulent precipitate forms almost instantly. After the absorption of 1 mol of $SO_3$, the reaction mixture is stirred for 2 hours and then suction filtered and the precipitate is repeatedly suspended in anhydrous toluene and again suction filtered. The product still moist with toluene (solids content about 80%) is stable in storage for some time (m.p. 164°–167° C.).

Preparation of Preliminary Product C

1 Mol of 2,4-diisocyanatotoluene is dissolved in 600 ml of 1,2-dichloroethane and an anhydrous stream of nitrogen which has been passed through 65% oleum is passed over the surface of the stirred solution at 2°–5° C. A yellowish, pulverulent precipitate forms almost instantly. After the absorption of 1 mol of $SO_3$, the reaction mixture is stirred for 2 hours and suction filtered and the precipitate is repeatedly suspended in anhydrous toluene and again suction filtered. A white powder melting at 183° C. is obtained.

Preparation of Compound 1

173.26 g of a 48% solution of preliminary product A in methylene chloride are added dropwise to a solution of 26.74 g of hexane-1,6-diol in 50 ml of methylene chloride at 40° to 50° C. The methylene chloride is distilled off after 3 hours. Compounds 2 to 4 are obtained by similar methods which the man of the art can easily work out from the method given here.

Preparation of Compound 6

173.3 g of a 48% solution of preliminary product A in methylene chloride are added dropwise at 40°–50° C. to a solution of 19.94 g of N,N-dimethylethylene diamine in 50 ml of methylene chloride. The methylene chloride is then distilled off.

Preparation of Compound 7

10.1 g of triethylamine are added dropwise to a solution of 25.4 g of preliminary product C in 100 ml of methylene chloride, and 27 g of stearyl alcohol are then stirred in at 40° C. 7.5 g of N-methyl-ethanolamine are introduced dropwise after 10 minutes and the mixture is stirred for 3 hours. After the addition of 9.9 g of concentrated HCl, the methylene chloride phase is separated off and the reaction mixture is washed twice with 10 ml portions of water and the methylene chloride is then removed.

Preparation of Compound 8

30.16 g of 2-sulpho-benzoic acid anhydride are introduced into 87.02 g of ethoxylated stearylamine at 50° C.

Preparation of Compound 9

28.16 g of preliminary product B are added to 74.29 g of ethoxylated stearylamine at 50° C.

Preparation of Compound 10

23.13 g of preliminary product C are added to 97 g of ethoxylated stearylamine at 50° C.

The dispersing agent used in the process according to the invention is added to the mixture to be dispersed in a quantity of 0.5 to 10% by weight, preferably 1.5 to 5% by weight, based on the quantity of the magnetic pigments. The advantageous effect of the dispersing agent according to the invention is maintained even if other, conventional additives are also used for building up the magnetic layer.

The composition and method of preparation of the dispersion of the magnetic recording carrier are similar to those used in conventional processes.

The binder used for the process according to the invention is a conventional thermoplastic resin, thermosetting resin or reactive resin or a mixture of such resins. Examples of thermoplastic resins include vinyl chloride/vinyl acetate copolymers, vinyl chloride/vinylidene chloride copolymers, vinylidene chloride/acrylonitrile copolymers, vinyl chloride/acrylonitrile copolymers, (meth)acrylic acid ester/acrylonitrile copolymers, (meth)acrylic acid ester/vinylidene chloride copolymers, (meth)acrylic acid ester/styrene copolymers, urethane elastomers, urethane resins, polyvinyl fluoride, butadiene/acrylonitrile copolymers, polyamide resins, polyvinylacetal resins, cellulose derivatives such as cellulose acetate butyrate, cellulose diacetate, cellulose triacetate, cellulose propionate, cellulose acetate propionate and nitrocellulose, styrene/butadiene copolymers, polyester resins and others.

The thermosetting resins and reactive resins have molecular weights which rise to high values on heating or exposure to light due to condensation or addition reactions. Examples are phenol resins, epoxy resins, hardenable polyurethane resins, urea resins, melamine resins and acrylic acid ester resins. Thermosetting polyurethane resins are preferred.

The binders may be used singly or as combinations. The proportions in which the ferromagnetic pigments are mixed with binder are in the range of about 8 to 25 parts by weight of binder to 100 parts by weight of the magnetic pigments.

The ferromagnetic pigments include ferromagnetic iron oxides such as $\gamma$-$Fe_2O_3$, $Fe_3O_4$ or $\gamma$-$Fe_2O_3$ or $Fe_3O_4$ with Co, Zn or other metals in solid solution and ferromagnetic chromium dioxides such as $CrO_2$ or $CrO_2$ with metallic elements such as Li, Na, Sn, Pb, Fe, Co, Ni or Zn or halogen atoms in solid solution.

Ferromagnetic metal pigments having a coating of oxide on their surface to improve their chemical stability may also be used within the scope of this invention.

The greater mechanical durability of the magnetic recording carrier may be achieved according to the invention, as already mentioned above, by adding a difunctional or higher functional isocyanate compound as cross-linking agent to the dispersion in a quantity which may readily be determined by routine tests. The quantity of isocyanate used for the process according to the invention may be in the region of 0.2 to 30% by weight, based on the quantity of binder.

Polyfunctional isocyanates are known in the art. Suitable compounds are mentioned, for example, in U.S. Pat. No. 3,649,541. The preparation of diisocyanates, for example, is described in the handbook "High Polymers", Volume XVI—Polyurethanes, page 21.

Organic solvents are normally used for preparing the dispersion. Examples of suitable solvents include ketones such as methyl ethyl ketone and cyclohexanone, alcohols, esters such as ethyl acetate and butyl acetate, cellulose solvents, ethers, aromatic solvents such as toluene and chlorinated hydrocarbons such as carbon tetrachloride, tetrahydrofuran and chloroform; ketones and esters are preferred.

Examples of suitable lubricants include silicone oils such as polysiloxanes, inorganic particles such as graphite and molybdenum disulphide, finely divided particles of polymers, e.g. of polyethylene or polytetrafluoroethylene, higher aliphatic acids, higher alcohols, higher aliphatic acid esters and fluorinated hydrocarbons. The higher aliphatic acids and their esters are preferred. The lubricants are used in quantities of 0.1 to 20 parts by weight to 100 parts by weight of binder.

The abrasives used are usually finely divided inorganic particles, e.g. of molten aluminium oxide, silicon carbide, chromium trioxide, corundum or diamond, with an average particle size of 0.05 to 0.5 $\mu$m. The abrasives are used in quantities of 0.5 to 20 parts by weight to 100 parts by weight of the binder.

Examples of suitable antistatic agents include electrically conductive particles, e.g. of graphite, carbon black or graft polymers of carbon black, non-ionic surface active agents, anionic surface active agents and cationic surface active agents.

Examples of suitable non-magnetic layer supports include synthetic resins such as polyesters, polyamides, polyolefines and cellulose derivatives, non-magnetic metals, glass, ceramics and paper. The layer support is used in the form of a film, a tape, a sheet, a card, a disc, a drum or some other suitable form.

Preparation of the magnetic dispersion may be carried out by a known process in which the magnetic pigments are dispersed with a portion of the binder solutions used, a sufficient quantity of solvent and dispersing agent in, optionally with the addition of other additives, in a dispersing apparatus, e.g. a ball mill in the form of a pot or stirrer vessel. Stirring of the dispersion is continued until the dispersion is sufficiently finely divided. The remainder of the binder solutions and the other additives are then added and homongenized with the dispersion already formed by further dispersion or vigorous stirring. In some cases, all the components for the dispersion may be introduced into the mill together and dispersed in a single phase. A completely homogeneous magnetic dispersion is then obtained after repeated filtration.

The magnetic dispersion is applied to the non-magnetizable layer support by means of conventional casting apparatus, e.g. an extruder caster. Before the liquid dispersion is dried on the support, which is normally carried out at temperatures of 50° to 90° C. for 2 to 5 minutes, the anisotropic magnetic pigments are orientated along the intended direction of recording by the action of a magnetic field. The magnetic layers may then be smoothed out and compressed in the usual apparatus by passing them between heated and polished rollers, optionally with the application of pressure and temperatures of 50° to 100° C., preferably 60° to 80° C. The thickness of the magnetic layer is generally from 1 to 20 $\mu$m.

The magnetic recording carriers produced according to the invention are distinguished by a slight roughness of the surface. The main advantages of the recording carriers produced according to the invention lie in the improved mechanical properties of the magnetic layer, especially their abrasion properties and sticking properties which increase their service life.

Another difference between the recording carriers according to the invention and those known in the art lies in the fact that when dispersing agents known in the art are used in quantities above the saturation capacity of the magnetic pigment surface, the mechanical properties of the magnetic layer are impaired and the magnetic heads are liable to corrode whereas in the process according to the invention the advantageous frictional values and high abrasion resistance are preserved under these conditions and no corrosion of the magnetic heads is observed.

The invention will now be described in detail with reference to Examples which serve only by way of illustration without restricting the invention.

EXAMPLE 1

A magnetic dispersion was prepared from 100 g of needle-shaped, Co-doped $Fe_3O_4$, 4 g of dispersing agent corresponding to compound 2, 19 g of polyester polyurethane, 4 g of a copolymer of polyvinyl chloride/polyvinyl acetate/polyvinyl alcohol, 0.5 g of lubricant, 284 g of THF (solvent) and 3.5 g of trifunctional isocyanate (Desmodur L-75 of Bayer AG) and after filtration the dispersion was applied to a polyethylene terephthalate layer support 10 μm in thickness as described above and after-treated, the total thickness of the layer finally obtained being 13.5 μm. The material was cut into strips 3.81 mm in width.

The coercivity $I_HC$ was determined as a measure of the electroacoustic properties and the ratio of the magnetization in the longitudinal direction to the saturation magnetization $M_R/M_S$ was determined as a measure of the orientation of the magnetic pigments. The mechanical properties were measured in terms of the tendency of the rolled up tape to stick and the amount of abrasion. To determine the tendency of the tape to stick, a strip 100 meters in length was wound on an aluminium core under a tension of 150 p and kept in an atmosphere of 40° C. and 90% relative humidity for 3 days. The amount of force required to unwind the tape was then measured with a dynamometer cell (in mp). To measure the abrasion, a strip 80 m in length was packaged in a conventional commercial compact cassette and rapidly run forwards and reversed 54 times in a conventional cassette recorder. The amount of abrasion found on the parts near the instrument (Kö) and on the contact felt of the cassette (Fi) were determined qualitatively (1=no abrasion, 6=severe abrasion).

EXAMPLE 2

The method was the same as in Example 1 except that 4 g of dispersing agent corresponding to compound 3 were used.

EXAMPLE 3

The method was the same as in Example 1 except that 4 g of dispersing agent corresponding to compound 4 were used.

COMPARISON EXAMPLE 4

The method was again the same as in Example 1 except that 4 g of the dispersing agent known as AS-3-acid disclosed in GB No. 1 415 949 were used.

The Table below shows that the recording carriers obtained with the dispersing agents according to the invention are considerably improved in their resistance to sticking and their resistance to abrasion compared with recording carriers prepared with a known dispersing agent while the electroacoustic properties are unchanged.

TABLE

| | $I_HC$ (kA/m) | $M_R/M_S$ | Tackiness of tape (mp) | Abrasion Kö | Fi |
|---|---|---|---|---|---|
| Example 1 | 51 | 0.86 | 0 | 3 | 3 |
| Example 2 | 51 | 0.85 | 4 | 3 | 3 |
| Example 3 | 51 | 0.85 | 0 | 4 | 3 |
| Comparison Example 4 | 51 | 0.86 | 35 | 4-5 | 5 |

EXAMPLE 5

A magnetic dispersion was prepared from 100 g of needle-shaped, Co-doped $Fe_3O_4$, 5 g of dispersing agent corresponding to compound 6, 9 g of a polyester polyurethane, 10 g of a copolymer of polyvinyl chloride/polyvinyl acetate/polyvinyl alcohol, 2.5 g of lubricant, 5 g of carbon black, 1 g of abrasive, 18 g of cyclohexanone, 284 g of THF and 3.3 g of trifunctional isocyanate and after filtration the dispersion was applied to a polyethylene terephthalate layer support 10μ in thickness as described above and after-treated, the total thickness of the layer finally obtained being 14.2 μm. The material was cut into strips 3.81 mm in width and examined by the tests described in Examples 1 to 4.

EXAMPLE 6

The method was the same as in Example 5 except that 5 g of dispersing agent corresponding to compound 1 were used.

COMPARISON EXAMPLE 7

The method was again the same as in Example 5 except that 5 g of the dispersing agent AS-3-acid disclosed in GB No. 1 415 949 were used.

The following Table shows that the dispersing agents used by the process according to the invention give rise to recording carriers with much higher abrasion resistance than those obtained with the known dispersing agents while the electroacoustic properties and adherence to the layer support remain the same. The adherence was determined qualitatively by sticking an adhesive tape to the magnetic layer and then tearing it off (2=firm adherence, 3=moderate adherence).

TABLE

| | $I_HC$ (kA/m) | $M_R/M_S$ | Adherence | Abrasion Kö | Fi |
|---|---|---|---|---|---|
| Example 5 | 53 | 0.81 | 2 | 2 | 1 |
| Example 6 | 53 | 0.80 | 2 | 2 | 2 |
| Comparison Example 7 | 53 | 0.83 | 3 | 3-4 | 3 |

We claim:

1. A process for the production of magnetic recording carriers by the preparation of a dispersion consisting essentially of finely divided magnetic pigments, a dispersing agent and a solution of a polymeric binder in an organic solvent and an isocyanate-compound as cross-linking agent for the polymeric binder and application of the dispersion to a non-magnetizable layer support followed by orientation of the magnetic pigment by means of a magnetic field and drying of the applied layer, wherein the dispersing agent used consists of at least one compound containing one reactive group which produces a firm bond to the magnetic pigment and at least one other group reactive to the NCO-groups of a difunctional or higher functional isocyanate consisting of a compound corresponding to the general formula

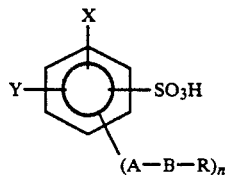

wherein

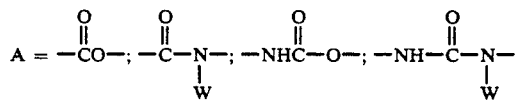

$n = 1$ or $2$ $W = H$ or an optionally branched alkyl group having 1 to 30 carbon atoms, $B =$ a straight chained, optionally branched alkyl group optionally containing hetero atoms, a cycloaliphatic group, or a cycloaliphatic-aromatic group,

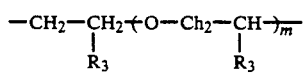

wherein
$m = 1-20$,
$R_3 = H$, or $CH_3$, or

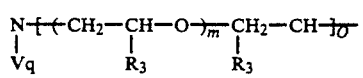

wherein
$V =$ alkyl with 1–30 carbon atoms,
$O = 1, 2,$ or $3$,
$q = 0$ or $1$
$0 + q = 3$;

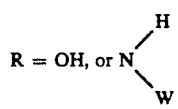

$X, Y = H$, $C_1$-$C_{30}$-alkyl or $C_1$-$C_{30}$-O-alkyl
and $X = Y$ or $X \neq Y$.

2. Process for the production of magnetic recording carriers according to claim 1, characterised in that the dispersing agent is used in a quantity of from 0.5 to 10% by weight, based on the magnetic pigment, and in that the difunctional or higher functional isocyanate is used in a quantity of from 0.2 to 30% by weight, based on the binder.

3. A process for the production of magnetic recording carriers according to claim 1 wherein the group of the dispersing agent reactive to the NCO-groups of the isocyanate is NH— or OH—.

4. A process for the production of magnetic recording carriers according to claim 1 wherein the polymeric binder contains NH— or OH-groups as groups reactive to the NCO-groups of the isocyanate.

5. A process for the production of a magnetic recording carrier which comprises the steps of preparing a composition comprising, finely divided magnetic pigments,
  a solution of a polymeric binder containing reactive groups in an organic solvent,
  a cross-linking agent consisting of a difunctional or higher functional isocyanate, and
  a dispersing agent consisting of at least one compound containing
  at least one reactive group capable of bonding to the magnetic pigment and at least one other group reactive to the NCO groups of the isocyanate,
  said dispersing agent corresponding to the general formula

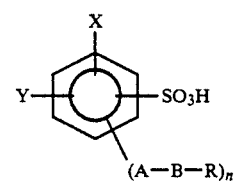

wherein

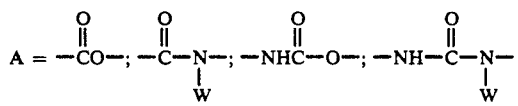

$n = 1$ or $2$ $W = H$ or an optionally branched alkyl group having 1 to 30 carbon atoms, $B =$ a straight chained, optionally branched alkyl group optionally containing hetero atoms, a cycloaliphatic group, or a cycloaliphatic-aromatic group,

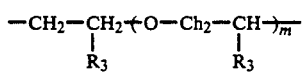

wherein
$m = 1-20$,
$R_3 = H$, or $CH_3$, or

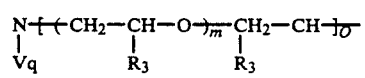

wherein
$V =$ alkyl with 1–30 carbon atoms,
$O = 1, 2,$ or $3$,
$q = 0$ or $1$
$0 + q = 3$;

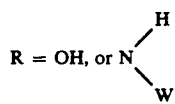

X, Y=H, $C_1$–$C_{30}$-alkyl or $C_1$–$C_{30}$-O-alkyl and X=Y or X≠Y, firmly bonding the dispersing agent to the magnetic pigments,
linking the dispersing agent to the binder by means of the isocyanate,
applying the composition to a non-magnetic layer support,
subsequently orienting the magnetic pigment by means of a magnetic field, and
drying the applied layer to form a magnetic recording layer.

* * * * *